April 26, 1932.   R. D. SALMON   1,855,204
MECHANICAL RELAY
Filed Sept. 24, 1930   2 Sheets-Sheet 1
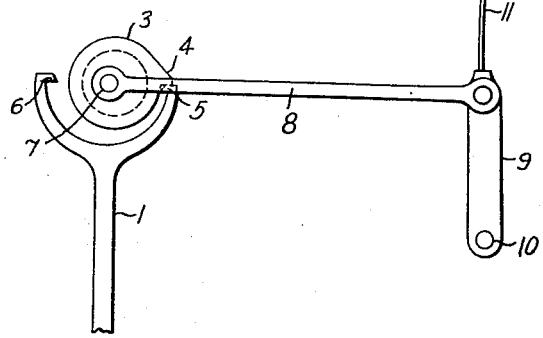
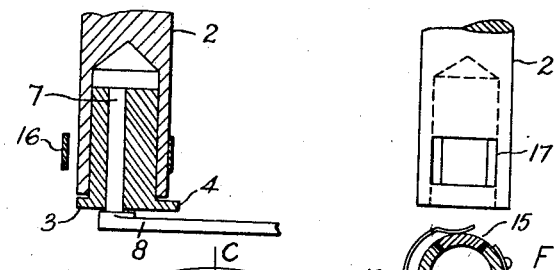
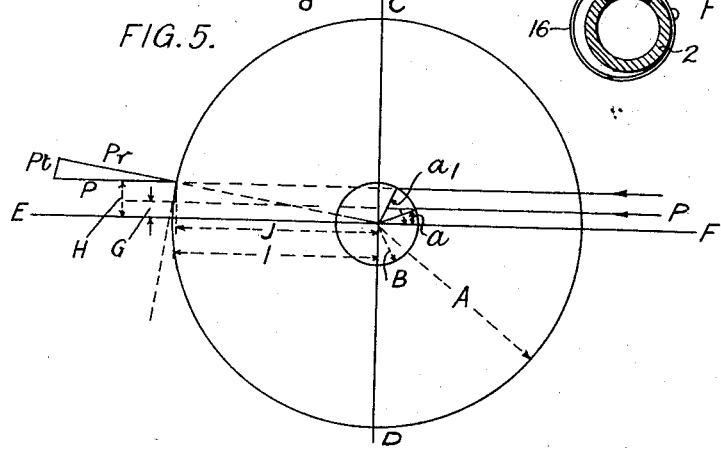
INVENTOR
REGINALD D. SALMON
BY R.C. Hopgood
ATTORNEY April 26, 1932.  R. D. SALMON  1,855,204
MECHANICAL RELAY
Filed Sept. 24, 1930   2 Sheets-Sheet 2

INVENTOR
REGINALD D. SALMON
BY R. C. Hopgood
ATTORNEY

Patented Apr. 26, 1932

1,855,204

UNITED STATES PATENT OFFICE

REGINALD DENNIS SALMON, OF CROYDON, SURREY, ENGLAND, ASSIGNOR TO CREED AND COMPANY, LIMITED, OF CROYDON, SURREY, ENGLAND

MECHANICAL RELAY

Application filed September 24, 1930, Serial No. 484,074, and in Great Britain December 13, 1929.

This invention relates to an improved form of mechanical relay in which a member is moved alternately and intermittently into one of two positions by mechanical power actuated through a start stop friction clutch in accordance with the movements of a controlling member.

The present invention comprises a member moved alternately and intermittently into one of two positions by mechanical power through the medium of a start stop friction clutch in accordance with the movements of a controlling member, in which the diameter of concentric friction surfaces on the driving and driven members of said clutch is proportioned to the eccentricity of a pin in the driven member which repeats said alternating and intermittent movement, whereby the torque transmitted due to the friction of said concentric surfaces always exceeds the resistance due to the pressure on the eccentric pin.

Friction clutches for transmitting rotary motion are known in which a movable shoe member is driven tighter into engagement with the driving member under the reaction due to the load. In the present application the load is resolvable into radial and tangential thrusts on the clutch members; the radial thrusts are utilized to obtain correspondingly greater frictional driving contact between plain concentric surfaces of the driving and driven members. A simple type of construction is thereby rendered possible, approximating to a plain friction drive escapement clutch, but having a more positive action under the load encountered in this method of application of a mechanical relay.

The invention permits a great reduction in the dimensions of the moving parts and consequently of the mass which it is necessary to accelerate and to arrest at each actuation. This mass is moreover, concentrated at the centre of rotation thereby reducing still further the moment of inertia of the driven member. This renders it very applicable to telegraphic apparatus requiring rapid operation without shock and the wear resulting therefrom.

Figure 6:
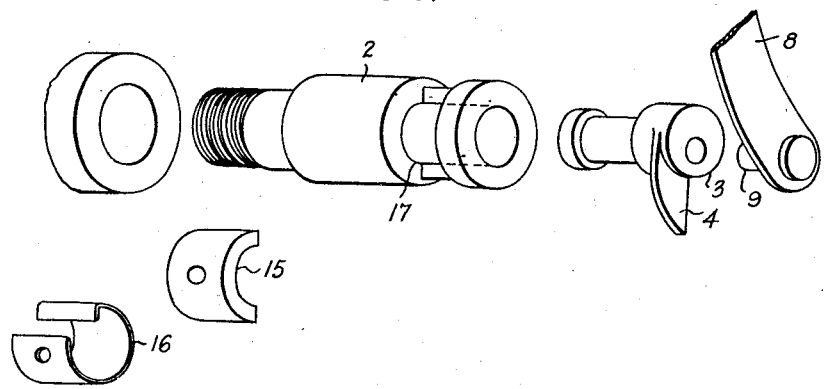
Figure 7:
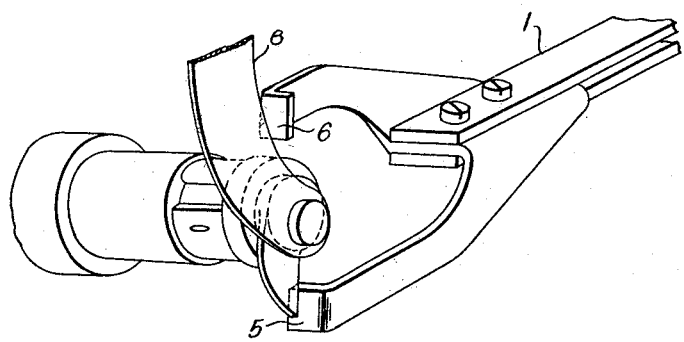

In the accompanying drawings, Fig. 1 represents diagrammatically an elevation of the improved mechanical relay as described in which the member actuated by mechanical power is employed to make firm contact alternately with one and the other of two contact screws. Fig. 2 is a section of the driving and driven clutch members showing the eccentric pin. Figs. 3 and 4 show the manner in which a spring pad is carried by the driving member to provide a degree of auxiliary frictional driving force in order to carry the driven member over the mid portions of its movement when no reaction from the load is available to provide sufficient driving grip. Fig. 5 is a diagram to explain the theory of the friction clutch. Figs. 6 and 7 show perspective drawings of a clutch according to the present invention.

In Fig. 1 is shown a control member 1 of an escapement friction clutch of which 2 is the driving member rotated continuously by a source of mechanical power, and 3 is the driven member carrying a tooth 4 which engages with one or the other of teeth 5 or 6 formed on the control member 1. The driven member 3 has an eccentric hole in which bears a pin 7 connected by rod 8 to an oscillating lever 9 pivoted at 10. Lever 9 carries a stiff flat spring 11 bearing contact faces 12 which make contact alternately with contact screws 13 and 14. The operation is such that each movement of control member 1 to one side or the other is followed by a corresponding movement of lever 9.

Referring to Fig. 5 it will be seen that although the friction clutch simply comprises plain concentric bearing surfaces a positive type of action is obtained in this application of a mechanical relay whatever the thrusts resulting from the load, simply by making these surfaces of a certain minimum diameter relative to the eccentricity of the pin which actuates the load.

In Fig. 5 let A represent the radius of the clutch surfaces and B the eccentricity of the pin 7. Also let P be the pressure on pin 7 due to the load, which in this case results from the flexing of spring 11 and is nil in the mid positions C and D and a maximum at either of the two extreme positions E and F. Each time the tooth 4 of the driven member is released, a quarter revolution is first performed but in this case P is assisting rotation so that no resistance is encountered. From say D to E or C to F, P increases but the angle $a$ decreases. If P be considered as always acting in a direction parallel to line F E and concentrated at the centre of the eccentric pin on radius B, it can be shown that if the length of radius A represents the magnitude of a constant pressure P, the tangential force P$r$ on the frictional driving surface of the driven member is proportional to the lengths G and H for angles $a$ and $a.1.$ respectively of the eccentric pin, whilst the radial pressure P$r$ is proportional to I and J respectively for the same angles. The tangential forces either assist or oppose the driving force whilst the radial pressures are utilized to secure frictional driving contact of the driven with the driving member. When $a=90°$ the torque tending to prevent rotation is P B and the corresponding driving torque is $$f.P\sqrt{A^2-B^2}$$

where $f$ is the coefficient of friction of the driving surfaces. If now $f$ be taken as .2 which is a fair average value under these circumstances it will be seen that the driving torque will always exceed the reaction torque at this critical angle of 90° for any value of P if A be made $$\sqrt{26B},$$

or approximately five times B. The greater the ratio of A to B the more positive becomes the action of the clutch over the mid position. When $a=0°$ the reaction torque is zero whilst the driving torque is at a maximum and is equal to P.$f$.A.

In order to carry the lever 9 over the mid position of its travel when there is practically no resistance to its movement, as in the application as described of the actuation of a spring contact, a small pad 15 is carried in a slot 17 in the wall of the driving member 2 and is pressed by spring 16 into frictional contact with the driven member 3. A small auxiliary driving force is thereby provided and prevents the lever 9 remaining in the central position.

It will be appreciated that the invention is not limited to the example shown in which a contact member is actuated by the mechanical relay although this is a preferred mode of application. It is also not limited to any precise ratio of the dimensions A to B but may be applied to all cases of similar mechanically relayed movements in which the thrusts resulting therefrom are utilized either wholly or mainly to supply the pressure between frictional surfaces on the driving and driven members respectively of a start stop clutch.

What is claimed is:

1. In telegraphic and like apparatus, a mechanical relay comprising a rotary driving member, a driven member rotatably mounted thereon and frictionally engaged thereby on cylindrical bearing surfaces, controlling means for releasably holding said driven member against rotation and when released to permit said driven member to rotate through a predetermined angle, and an eccentric pin carried by said driven member for the purpose of transmitting driving forces, the eccentricity of said pin being proportioned with respect to the diameter of the said bearing surfaces so that the driving torque developed by virtue of the frictional contact at the bearing surfaces as augmented by the reaction due to the pressure on said pin always exceeds the resisting torque due to the pressure on said pin.

2. In telegraphic and like apparatus, a mechanical relay comprising a rotary driving member, a driven member rotatably mounted thereon and frictionally engaged thereby on cylindrical bearing surfaces, controlling means for releasably holding said driven member against rotation and when released to permit said driven member to rotate through a predetermined angle, and an eccentric pin carried by said driven member for the purpose of transmitting driving forces therefrom, the radius of said bearing surfaces being approximately five times as great as the eccentricity of said pin.

3. In telegraphic and like apparatus, a mechanical relay comprising a rotary driving member, a driven member rotatably mounted thereon and frictionally engaged thereby on cylindrical bearing surfaces, a tooth extending laterally from said driven member, a double-armed escapement member associated with said tooth and disposed when oscillated to intercept same alternately in positions one half revolution relatively displaced, an eccentric pin on said driven member for transmitting driving forces on rotation of said member, the eccentricity of said pin being proportioned with respect to the diameter of the said bearing surfaces so that the driving torque developed by virtue of the frictional contact at the bearing surfaces as augmented by the reaction due to the pressure on said pin always exceeds the resisting torque due to the pressure on said pin.

4. In telegraphic or like apparatus, a mechanical relay for reproducing intermittent oscillatory movements comprising a driving shaft adapted for continuous rotation, a driven member rotatably mounted upon cylindrical bearing surfaces on said driving shaft, an abutment carried by said driven member, an oscillatable escapement device having a pair of escapement arms one of which is disposed to engage said abutment when the escapement device is in one end position and to release said abutment in the other end position, in which latter position the other escapement arm is disposed to engage said abutment upon a subsequent half revolution of said driven member, an eccentric pin carried by said driven member and a driving pin disposed to be reciprocated by said eccentric pin, the ratio of the eccentricity of said pin to the radius of the bearing surfaces being proportioned with respect to the coefficient of friction at said surfaces as to ensure the driving torque always exceeding the resisting torque due to the pressure exerted by said rod on said pin.

5. A device for converting rotary motion into intermittent linear motion comprising a driving member, a driven member rotatably mounted thereon and frictionally engaged thereby on cylindrical bearing surfaces, escapement means for holding said driven member against rotation and for releasing said member to rotate a predetermined amount, and an eccentric pin carried by said driven member for transmitting said linear motion, the ratio of the eccentricity of said pin to the radius of said bearing surfaces being proportioned with respect to the coefficient of friction at said surfaces as to insure the frictional driving torque therebetween always exceeding the resisting torque due to the pressure resisting the linear motion on said pin.

6. A device for converting rotary motion into intermittent linear motion comprising a driving member adapted for continuous rotation and having a terminal sleeve-like portion, a driven member mounted within said sleeve-like portion, an abutment carried by said driven member, escapement means associated with said abutment alternately to engage and release said member per half revolution thereof, and an eccentric driving pin carried by said driven member, the internal diameter of said sleeve-like portion of the driving shaft where it engages the driven member being approximately 10 times as great as the eccentricity of said pin.

7. In telegraphic and like apparatus, a mechanical relay comprising a rotary driving member, a driven member rotatably mounted thereon and having frictional driving engagement therewith on bearing surfaces constituted by surfaces of revolution, controlling means for releasably holding said driven member against rotation and when relased to permit said driven member to rotate through a predetermined angle, resilient means carried by said driving member and engaging said driven member for exerting an auxiliary driving grip between driving and driven members, an eccentric driving pin, a lever connected to the eccentric pin, and contacts controlled by said lever.

8. In telegraphic and like apparatus, a mechanical relay comprising a rotary driving member, a driven member rotatably mounted thereon and having frictional driving engagement therewith on bearing surfaces constituted by surfaces of revolution, resilient means carried by said driving member and engaging said driven member for exerting an auxiliary driving grip between said members, an eccentric driving pin carried by said driven member, and a contact actuating lever connected to said pin.

9. In telegraphic and like apparatus, a mechanical relay comprising a rotary driving member, a driven member rotatably mounted thereon in frictional driving engagement therewith on cylindrical bearing surfaces, resilient means carried by said driving and engaging said driven member for exerting an auxiliary driving grip between said members, a driving pin eccentrically mounted on said driven member, and a contact operating lever connected at one end to said pin so as to receive reciprocating movement during rotation of the driven member.

10. In telegraphic and like apparatus, a mechanical relay for reproducing intermittant oscillatory movements comprising a driving shaft adapted for continuous rotation, a driven member rotatably mounted upon cylindrical bearing surfaces on said driving shaft, resilient means carried by said driving and frictionally engaging said driven member for exerting an auxiliary driving grip between said members, and a driving pin mounted eccentrically on said driven member, controlling means for releasably holding said driven member against rotation, and means effective upon the release of said driven member to arrest rotation thereof after rotation through a predetermined angle.

11. A device for converting rotary motion into intermittent linear motion comprising a driving member, a driven member rotatably mounted upon bearing surfaces thereon constituted by surfaces of revolution, resilient means carried by said driving and engaging said driven member to exert an auxiliary driving grip between said members.

12. A device for converting rotary motion into intermittent linear motion comprising a driving member adapted for continuous rotation and having a terminal sleeve-like portion, a driven member mounted within said sleeve-like portion, a bearing pad for said driven member carried by said driving shaft, means for resiliently pressing said pad into contact with the driven member to maintain an auxiliary driving grip thereon, an abutment carried by said driven member, escapement means associated with said abutment alternately to engage and release said member per half revolution thereof and an eccentric driving pin carried by said driven member, the internal diameter of said sleeve-like portion of the driving shaft where it engages the driven member being approximately 5 times as great as the eccentricity of said pin.

13. A device for converting rotary motion into intermittent linear motion comprising, a driving member having a sleeve portion, a driven member rotatably mounted within said sleeve portion in frictional driving engagement therewith, an eccentric driving pin carried by said driven member, the eccentricity of said pin being so proportioned with respect to the diameter of said bearing surfaces that the driving torque developed by virtue of the frictional contact at the bearing surfaces when augmented by the reaction of a load on said pin always exceeds the resisting torque due to the load on the pin.

14. A device according to claim 13, wherein resilient means carried by the driving member and engaging said driven member exerts an auxiliary driving grip between the driving and driven members.

15. A device according to claim 13, wherein the wall of the sleeve portion is slotted, and a spring pressed member located in the slot in engagement with the driven member.

16. A device according to claim 13, wherein the wall of the sleeve portion is slotted and the driven member having hub portions, and a spring pressed member located in the slot in engagement with the periphery of the driven member between hub portions thereof.

17. A device for converting rotary motion into intermittent linear motion comprising, rotatable driving and driven members, one of said members having a sleeve portion and the other being rotatably mounted within said sleeve portion in frictional driving engagement therewith, an eccentric driving pin carried by said driven member, the eccentricity of said pin being so proportioned with respect to the diameter of said bearing surfaces that the driving torque developed by virtue of the frictional contact at the bearing surfaces when augmented by the reaction of a load on said pin always exceeds the resisting torque due to the load on the pin.

In witness whereof I hereunto subscribe my name this fourth day of September 1930.

REGINALD DENNIS SALMON.